(12) United States Patent
Sullivan, Sr.

(10) Patent No.: US 6,896,231 B1
(45) Date of Patent: May 24, 2005

(54) ARTICULATED DRINK HOLDER ASSEMBLY FOR DISABLED PERSONS

(76) Inventor: Thomas E. Sullivan, Sr., 411 E. Holland, Minden, NE (US) 68959

( * ) Notice: Subject to any disclaimer, the term of this patent is extended or adjusted under 35 U.S.C. 154(b) by 0 days.

(21) Appl. No.: 10/350,974

(22) Filed: Jan. 23, 2003

(51) Int. Cl.⁷ .............................. E04G 3/00; A47F 5/00
(52) U.S. Cl. ................................ 248/311.2; 248/276.1; 248/278.1
(58) Field of Search ........................ 248/311.2, 224.51, 248/276.1, 281.11, 278.1, 282.1, 284.1, 288.31, 248/288.51, 299.1, 314, 103, 102, 541

(56) References Cited

U.S. PATENT DOCUMENTS

| | | | | |
|---|---|---|---|---|
| 1,382,783 | A * | 6/1921 | Howard ................... | 248/276.1 |
| 1,460,697 | A * | 7/1923 | Bendlin ................... | 248/276.1 |
| 2,508,974 | A * | 5/1950 | Scott et al. ............ | 248/229.15 |
| 2,839,260 | A * | 6/1958 | Jacobi, Jr. .............. | 248/311.2 |
| 3,170,665 | A * | 2/1965 | Ryan ........................ | 248/311.2 |
| 3,734,439 | A * | 5/1973 | Wintz ...................... | 248/224.51 |
| 3,840,204 | A * | 10/1974 | Thomas et al. .......... | 248/311.2 |
| 3,910,538 | A * | 10/1975 | Baitella .................. | 248/124.1 |
| 4,131,259 | A * | 12/1978 | Franks ..................... | 248/311.2 |
| 4,143,652 | A * | 3/1979 | Meier et al. ............. | 600/203 |
| 4,402,481 | A * | 9/1983 | Sasaki ...................... | 248/282.1 |
| 4,458,870 | A * | 7/1984 | Duncan et al. .......... | 248/279.1 |
| 4,491,435 | A * | 1/1985 | Meier ....................... | 403/55 |
| 4,535,923 | A * | 8/1985 | Manke ....................... | 224/550 |
| 4,721,276 | A * | 1/1988 | Moss ........................ | 248/311.2 |
| 4,997,156 | A * | 3/1991 | Allen ....................... | 248/311.2 |
| 5,370,570 | A * | 12/1994 | Harris ...................... | 248/279.1 |
| 5,484,129 | A * | 1/1996 | Megal ...................... | 248/311.2 |
| 5,609,565 | A * | 3/1997 | Nakamura ................. | 600/229 |
| 5,723,808 | A * | 3/1998 | Devall ...................... | 89/37.04 |
| 5,964,439 | A * | 10/1999 | Johnson ................... | 248/278.1 |
| 6,170,598 | B1 * | 1/2001 | Furukawa ................. | 180/334 |
| 6,325,350 | B1 * | 12/2001 | Mancuso .................. | 248/311.2 |
| 6,431,505 | B2 * | 8/2002 | Chinn et al. ............. | 248/121 |
| 6,457,616 | B2 * | 10/2002 | Gagne ...................... | 224/148.4 |
| 6,575,417 | B1 * | 6/2003 | Krommenakker ........ | 248/311.2 |

FOREIGN PATENT DOCUMENTS

GB              674016 A   *   6/1952

OTHER PUBLICATIONS

Noga Engineering, Ltd., webpage: www.noga.com/holding/hold_Get Accessorie.*
Noga Engineering Ltd. web page at www.noga.com entitled "Holding System".

* cited by examiner

Primary Examiner—Anita M. King
(74) Attorney, Agent, or Firm—Thomte, Mazour & Niebergall; Dennis L. Thomte

(57) ABSTRACT

A drink holder for disabled persons with the holder being adapted to be secured to a chair, wheelchair, bed, wall, etc. A cup holder is mounted to the outer end of an articulated arm assembly with the assembly being adjustable to properly position the cup holder. When a cup or glass is placed in the cup holder, a disabled person may move his or her head to gain access to the straw extending from the cup or glass in the cup holder.

9 Claims, 5 Drawing Sheets

ARTICULATED DRINK HOLDER ASSEMBLY FOR DISABLED PERSONS

BACKGROUND OF THE INVENTION

1. Field of the Invention

This invention relates to a drink holder assembly for disabled persons and more particularly to an articulated drink holder assembly for disabled persons which enables a drink cup or the like to be positioned in many different locations depending upon the particular needs of the disabled person.

2. Description of the Related Art

Many disabled persons are confined to beds, chairs or wheelchairs for extended periods of time. Further, many of those disabled persons are unable to use their arms which means that caregivers must periodically assist the disabled persons to drink liquids to prevent dehydration. In some cases, the caregivers are not able to provide liquids to the disabled person as often as needed. Additionally, in some nursing homes, the cost of the caregiving services are dependent upon the amount of the assistance required by the disabled person.

SUMMARY OF THE INVENTION

A drink holder assembly is provided for disabled persons and comprises a receiver support which is attached to a supporting member such as a chair, wheelchair, bed or wall. The receiver support has one-half of a dovetail connection provided thereon. A slide mount, having one-half of a dovetail connection provided thereon, is selectively slidably connected to the receiver support through the dovetail connections. A first elongated support arm has one end selectively pivotally secured to the mount and has an articulated arm assembly secured to its other end. The articulated arm assembly includes at least first and second articular arms which are joined together and which are locked in place by a single locking knob. A connector element is secured to the outer end of the articulated arm assembly. A drink holder is selectively removably secured to the connector element. A utensil holder could replace the drink holder with the utensil holder comprising means for supporting a plate, saucer, etc., thereon.

A principal object of the invention is to provide an improved drink holder assembly for disabled persons.

A further object of the invention is to provide an improved utensil holder assembly for disabled persons.

A further object of the invention is to provide an articulated drink holder assembly for disabled persons which enables a drink container to be positioned in a wide variety of different positions dependent upon the needs of the disabled person.

Still another object of the invention is to provide an articulated drink holder assembly which is removably secured to a supporting surface such as a bed, chair, wheelchair or wall.

Yet another object of the invention is to provide an articulated drink holder assembly for disabled persons which is easy to use.

These and other objects of the invention will be apparent to those skilled in the art.

DESCRIPTION OF THE PREFERRED EMBODIMENT

Figure 1:
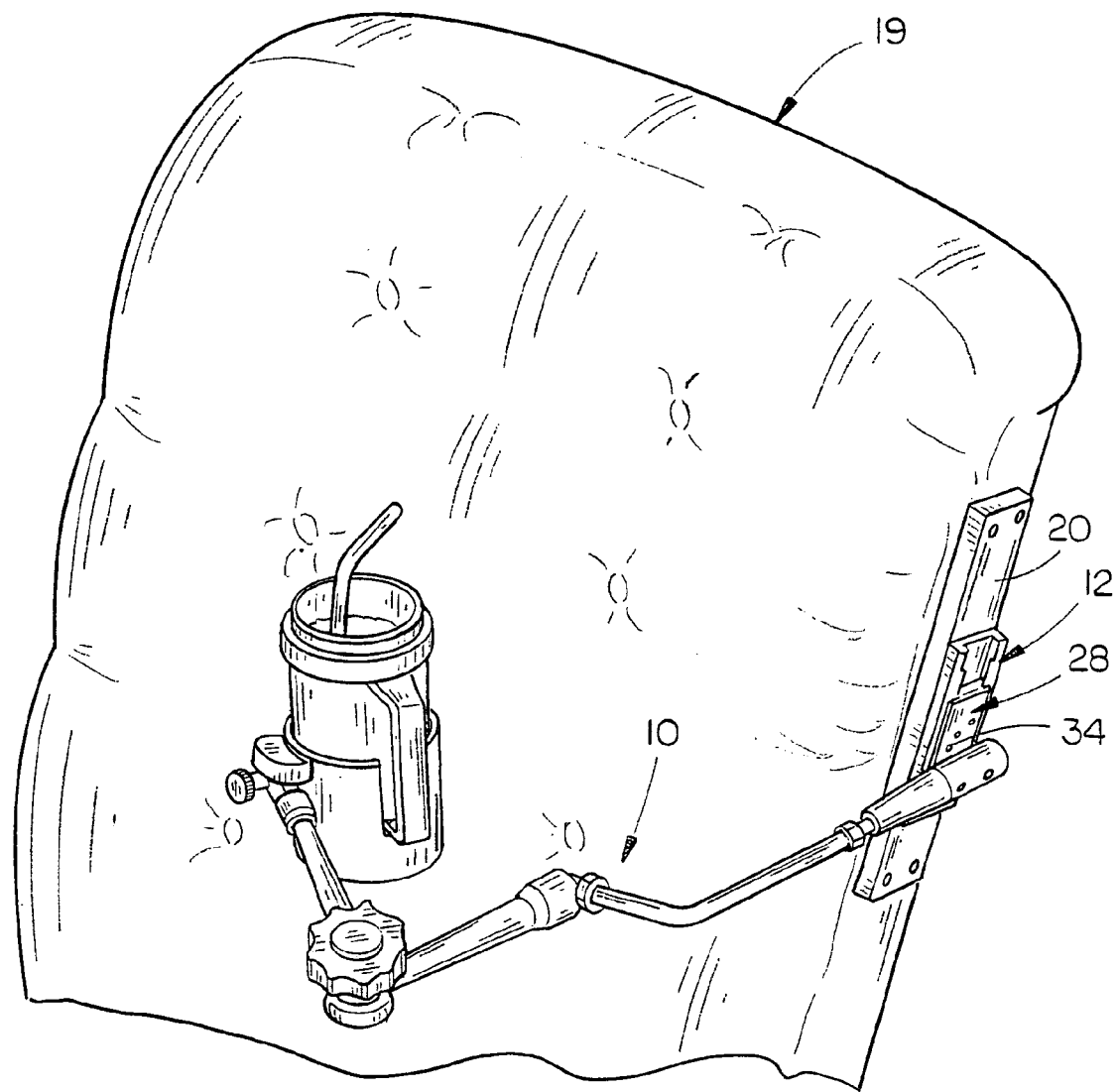
FIG. 1 is a perspective view of the holder of this invention secured to a chair in which the disabled person will sit.

The drink or utensil holder of this invention is referred to generally by the reference numeral 10. Although the holder assembly 10 of this invention is shown and described as being for use as a drink holder, the assembly could be modified somewhat so that instead of holding a drink container, it could hold a utensil such as a plate, saucer, etc.

Assembly 10 includes a receiver support 12 which is preferably formed from aluminum or the like. For purposes of description, support 12 will be described as having a lower end 14 and an upper end 16. A plurality of screws 18 extend through the support 12 for attachment to a supporting surface or member such as a chair 19, wheelchair, bed, wall, etc. To add stability to the device, the receiver support 12 may be screwed to a board 20 which in turn is secured to the chair 19, wheelchair, bed, wall, etc. A chair 19 is illustrated in FIG. 1. Receiver support 12 is provided with a central recessed area 22 having dovetails 24 and 26 at its opposite sides.

A plate-like slide mount or receiver member 28 is provided which has dovetails 30 and 32 at its opposite sides which are adapted to slidably mate with the dovetails 24 and 26. The mount 28 is slidably received in the recessed area 22 through the dovetail connections for slidably securing the mount 28 to the receiver support 12. Mount 28 is provided with a plurality of radially spaced openings 34 formed in the outer surface thereof.

Figure 2:
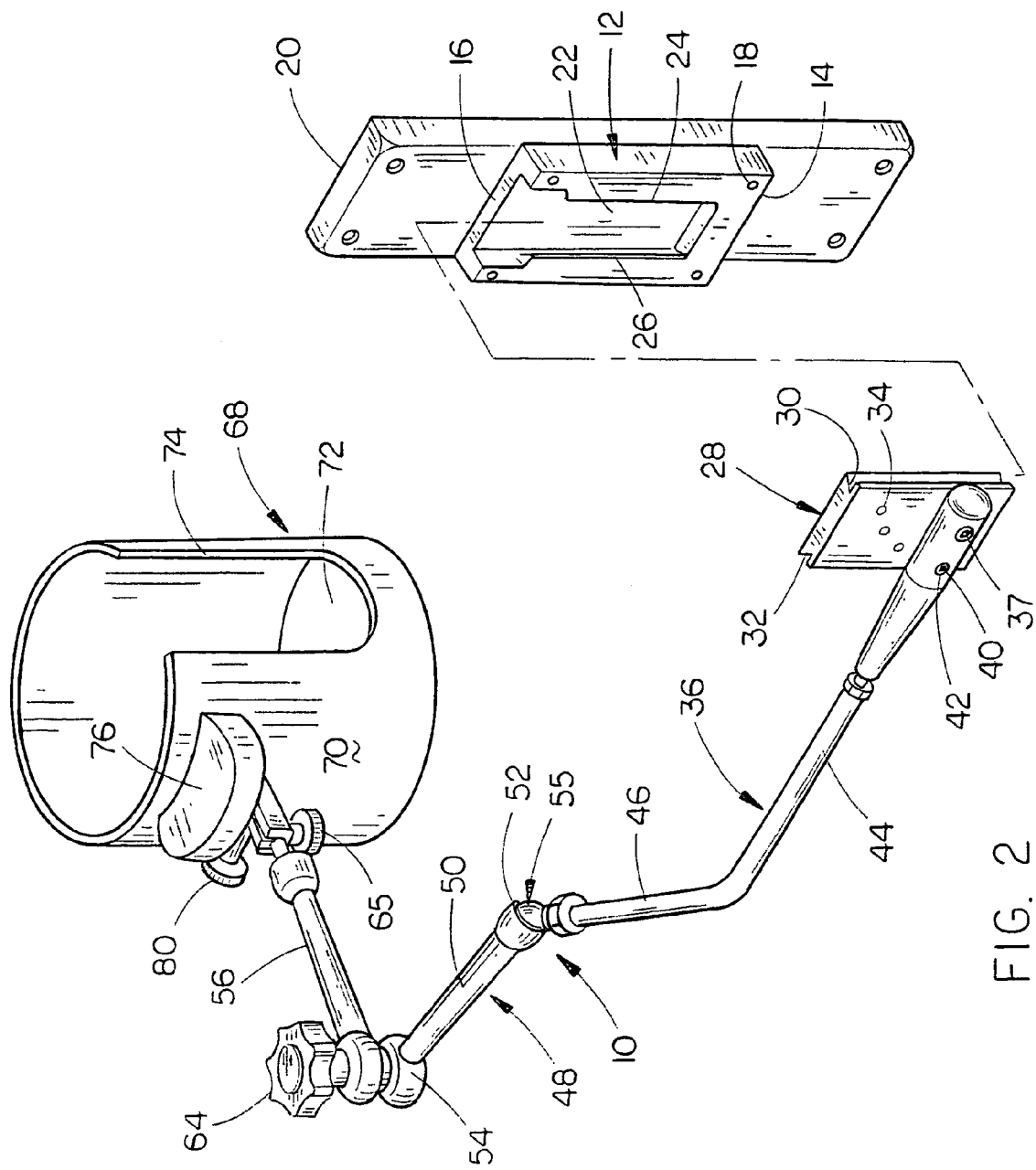
FIG. 2 is a partial exploded perspective view of the holder of this invention.
Figure 3:
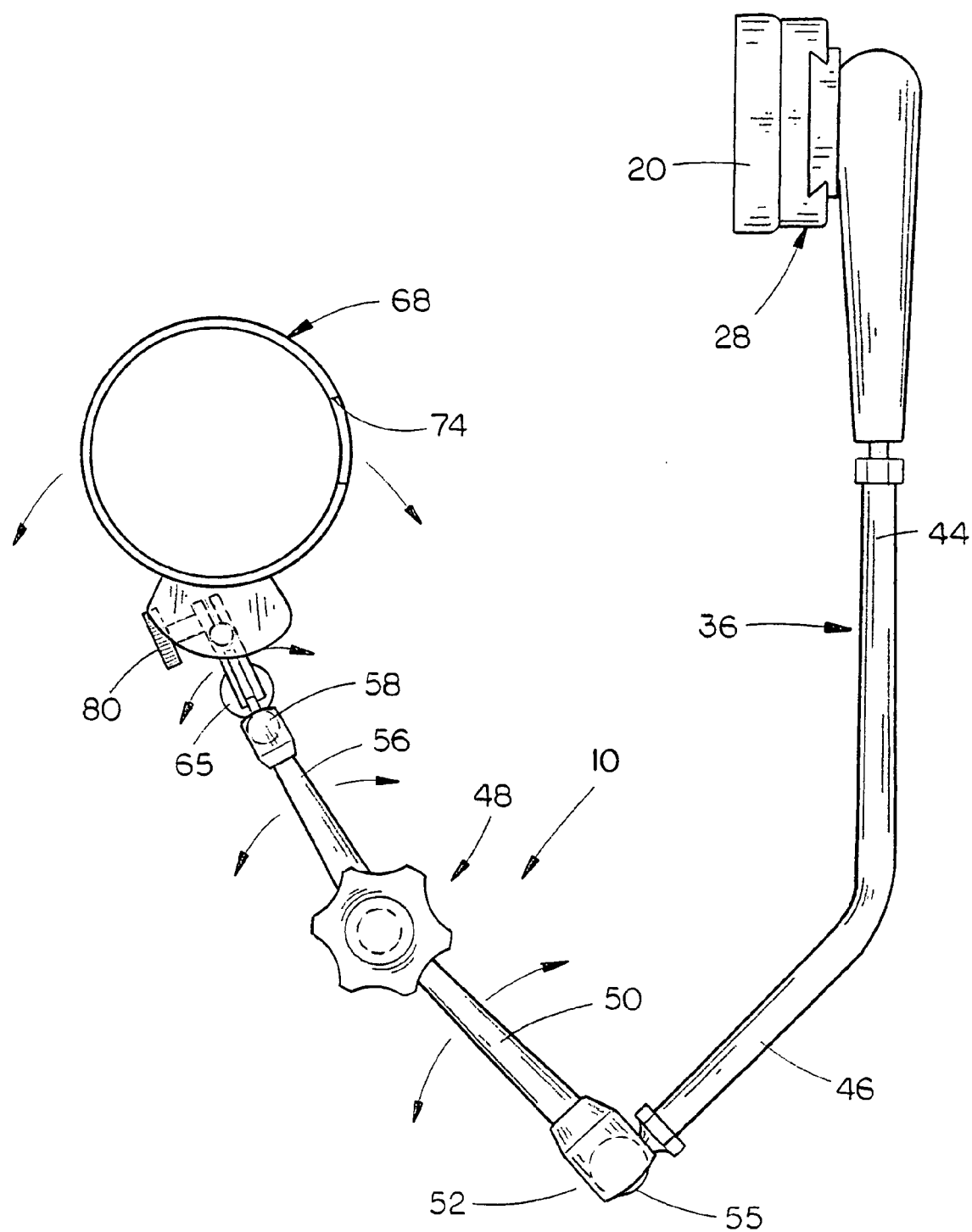
FIG. 3 is a top view of the holder of this invention.
Figure 4:
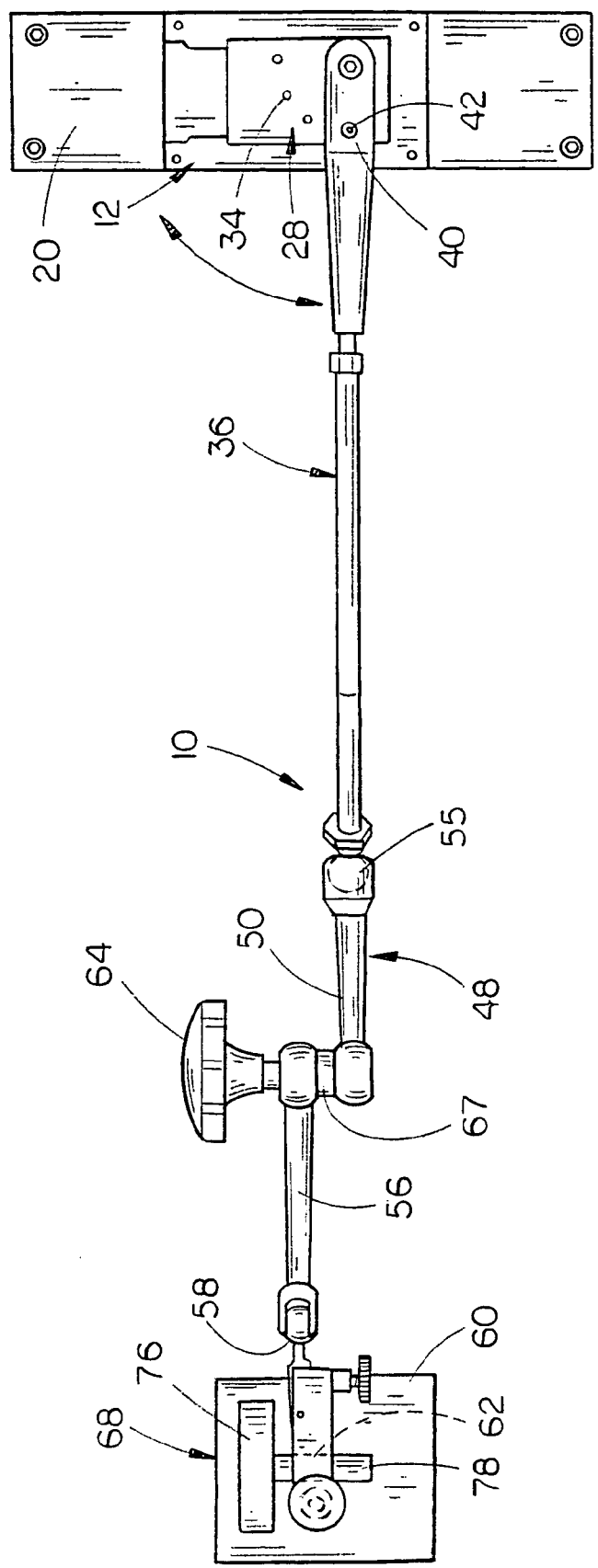
FIG. 4 is a side view of the holder of this invention.
Figure 5:
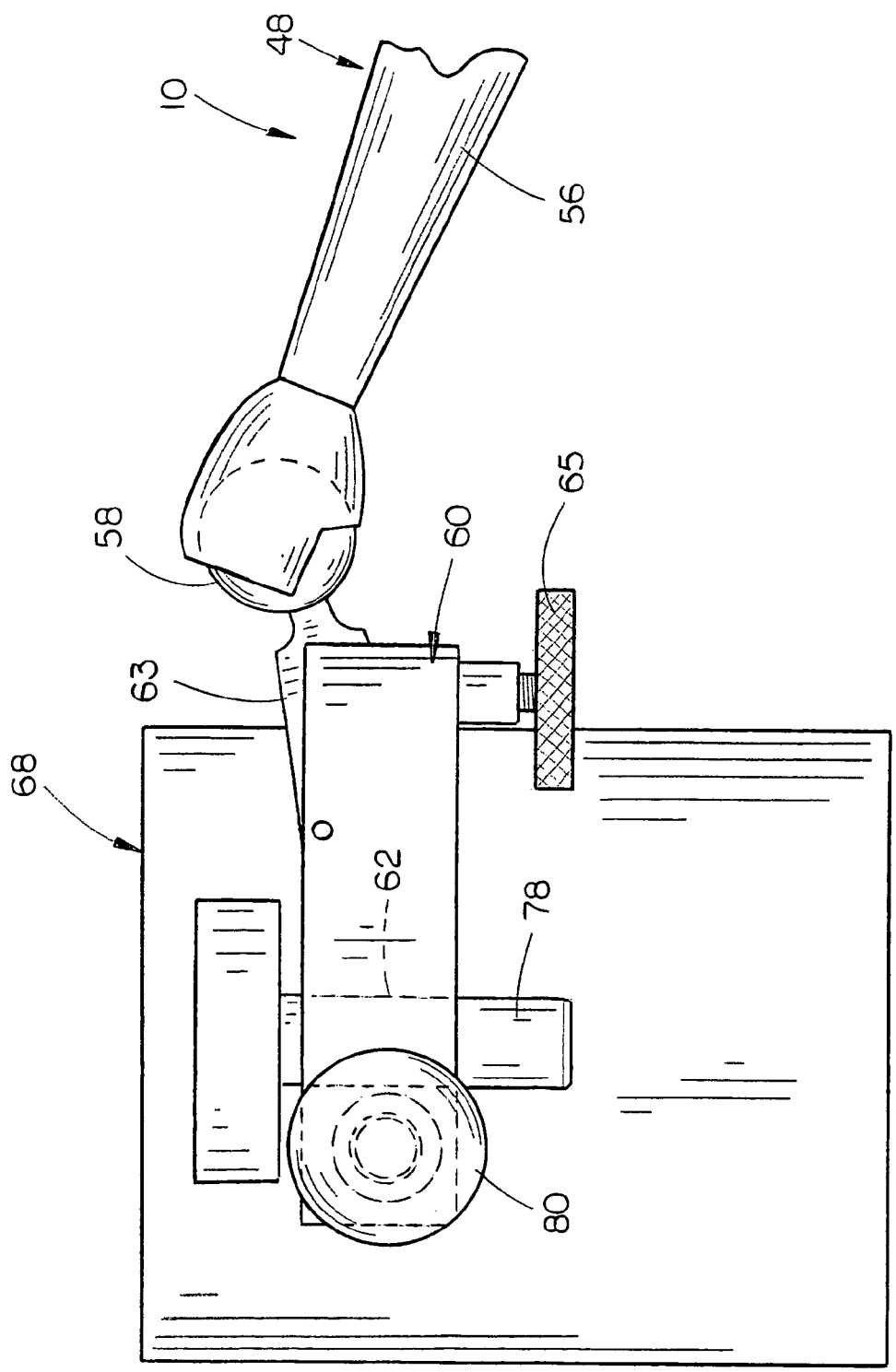
FIG. 5 is a side elevational view of the outer end of the holder of this invention.

An elongated support arm 36 has one end thereof selectively pivotally secured to mount 28 by means of pin, screw or bolt 37 extending therethrough which is secured to the mount 28. Support arm 36 has a threaded opening 40 formed therein which selectively registers with the radially spaced openings 34. A set screw 42 is threadably inserted in the threaded opening 40 with the inner end thereof being received by one of the spaced-apart openings 34 to enable the support arm to be maintained in different angular positions relative to the mount 28. As seen in FIGS. 2 and 3, arm 36 has an arm portion 44 which extends transversely from the mount 28 and an arm portion 46 which extends angularly from arm portion 44. The angular portion 46 enables the assembly to extend around the side of a chair, bed, wheelchair, etc., as illustrated in FIG. 1.

The numeral 48 refers to a holding device (holding arm assembly) which is manufactured by Noga Engineering, Ltd., P.O. Box 55, Schlomi 22832 Israel. Noga Engineering makes various types of the holding arms but the holding arm assembly which is the best suited for applicant's use is the MG Holder. Holder 48 includes a first arm 50 having ends 52 and 54. End 52 is provided with a ball and socket connection 55 with the ball portion of the connection being secured to the outer end of the arm portion 46 of support arm 36 (FIGS. 2, 3). Holder 48 also includes an arm 56 which is pivotally connected to the end 54 of arm 50. The outer end of arm 56 is provided with a ball and socket connector 58 with the ball portion thereof having a connector 60 secured thereto which has an opening or bore 62 formed therein. Connector 60 includes an arm 63 pivotally mounted thereon which has an adjustment knob 65 connected thereto.

Holder 48 is provided with a locking knob 64 which is connected to the ball and socket connection 55 at the end 54 of arm 50, the pivotal connection 67 between arms 50 and 56, and the ball and socket connection 58 at the outer end of arm 56. When knob 64 is loosened, all of the connection points just described are free to be moved in any direction made possible by the ball and socket connections 55, 58 and the pivotal connection 67. When the knob 64 is tightened or locked, the various connections are all locked into the particular position in which they are at the time that the knob is locked.

The numeral 68 refers to a drink holder which is in the form of a hollow cylindrical member 70 having a bottom 72. An elongated slot 74 is formed in the side wall of body 70 for receiving the handle of a cup or glass. Ear 76 extends laterally from cup holder 68 and has a pin 78 extending downwardly therefrom which is adapted to be received in the opening 62 of connector 60. Connector 60 includes a locking knob 80 which locks the pin 78 within opening 62.

When the holder assembly 10 of this invention is mounted to a chair or the like, the support arm 36 may be angularly disposed with respect to the mount 28 as previously described. The locking knob 64 on the holder 48 may be loosened so that the arms 50, 56 and connector 60 may be positioned so that the cup holder 68 is positioned in a position where a disabled person can move his or her head to a position to gain access to a straw extending from the cup within the holder 64. The articulation of the assembly enables the assembly to be adapted for different types of chairs, beds, etc. The assembly is also adapted to accommodate persons of different builds. If the disabled person is being moved from a chair to a bed or vice versa, the device may be easily swung out of the way to enable the patient to be moved.

Thus it can be seen that the invention accomplishes at least all of its stated objectives.

I claim:

1. A drink holder assembly for disabled persons, comprising:
   a receiver support for attachment to a supporting member;
   a first elongated support arm having first and second ends;
   a mount selectively connected to said receiver support;
   said first end of said first elongated support arm being selectively pivotally secured to said mount;
   an articulated arm assembly having first and second ends;
   said articulated arm assembly including at least first and second articular arms;
   said first and second articular arms each having first and second ends;
   said first end of said first articular arm being selectively movably connected to said second end of said support arm by a first selectively articulable joint;
   said second end of said first articular arm being selectively movably connected to said first end of said second articular arm by a second selectively articulable joint;
   a connector element selectively movably connected to said second end of said second articular arm by a third selectively articulable joint;
   a drink holder selectively removably secured to said connector element;
   said drink holder comprising a hollow cylindrical body member having upper and lower ends and a downwardly extending mounting pin positioned at one side thereof which is selectively receivable by said connector element;
   said mounting pin being selectively rotatably received by said connector element.

2. A drink holder assembly for disabled persons, comprising:
   a receiver support for attachment to a supporting member;
   a first elongated support arm having first and second ends;
   a mount selectively connected to said receiver support;
   said first end of said first elongated support arm being selectively pivotally secured to said mount;
   an articulated arm assembly having first and second ends;
   said articulated arm assembly including at least first and second articular arms;
   said first and second articular arms each having first and second ends;
   said first end of said first articular arm being selectively movably connected to said second end of said support arm by a first selectively articulable joint;
   said second end of said first articular arm being selectively movably connected to said first end of said second articular arm by a second selectively articulable joint;
   a connector element selectively movably connected to said second end of said second articular arm by a third selectively articulable joint;
   a drink holder selectively removably secured to said connector element;
   said mount having a plurality of radially spaced openings formed therein and wherein a screw member extends from said first elongated support arm into one of said radially spaced openings to maintain said first elongated support arm in various selected positions with respect to said mount.

3. A utensil holder assembly for disabled persons, comprising:
   a receiver support for attachment to a supporting member;
   a first elongated support arm having first and second ends;
   a mount selectively connected to said receiver support;
   said first end of said first elongated support arm being selectively pivotally secured to said mount;
   an articulated arm assembly having first and second ends;
   said articulated arm assembly including at least first and second articular arms;
   said first and second articular arms each having first and second ends;
   said first end of said first articular arm being selectively movably connected to said second end of said support arm by a first selectively articulable joint;
   said second end of said first articular arm being selectively movably connected to said first end of said second articular arm by a second selectively articulable joint;
   a connector element selectively movably connected to said second end of said second articular arm by a third selectively articulable joint;
   a utensil holder selectively removably secured to said connector element;
   said utensil holder comprising a hollow cylindrical body member having upper and lower ends and a downwardly extending mounting pin positioned at one side thereof which is selectively receivable by said connector element;
   said mounting pin being selectively rotatably received by said connector element.

4. A utensil holder assembly for disabled persons, comprising:
   a receiver support for attachment to a supporting member;
   a first elongated support arm having first and second ends;

a mount selectively connected to said receiver support;
said first end of said first elongated support arm being selectively pivotally secured to said mount;
an articulated arm assembly having first and second ends;
said articulated arm assembly including at least first and second articular arms;
said first and second articular arms each having first and second ends;
said first end of said first articular arm being selectively movably connected to said second end of said support arm by a first selectively articulable joint;
said second end of said first articular arm being selectively movably connected to said first end of said second articular arm by a second selectively articulable joint;
a connector element selectively movably connected to said second end of said second articular arm by a third selectively articulable joint;
a utensil holder selectively removably secured to said connector element;
said mount having a plurality of radially spaced openings formed therein and wherein a screw member extends from said first elongated support arm into one of said radially spaced openings to maintain said first elongated support arm in various selected positions with respect to said mount.

5. In combination with a supporting member, a drink holder assembly for disabled persons, comprising:
a receiver support removably secured to the supporting member;
a first elongated support arm having first and second ends;
a mount selectively connected to said receiver support;
said first end of said first elongated support arm being selectively pivotally secured to said mount;
an articulated arm assembly having first and second ends;
said articulated arm assembly including at least first and second articular arms;
said first and second articular arms each having first and second ends;
said first end of said first articular arm being selectively movably connected to said second end of said support arm by a first selectively articulable joint;
said first selectively articulable joint allowing said first articular arm to move about a plurality of axes with respect to said support arm;
said second end of said first articular arm being selectively movably connected to said first end of said second articular arm by a second selectively articulable joint;
said second selectively articulable joint allowing said second articular arm to move about a single axis with respect to said first articular arm;
a connector element selectively movably connected to said second end of said second articular arm by a third selectively articulable joint;
said third selectively articulable joint allowing said connector element to move about a plurality of axes with respect to said second selectively articulable joint;
and a drink holder selectively removably secured to said connector element;
said drink holder comprising a hollow cylindrical body member having upper and lower ends and a downwardly extending mounting pin positioned at one side thereof which is selectively receivable by said connector element.

6. The drink holder assembly of claim 5 wherein said mounting pin is rotatably received by said connector element.

7. The drink holder assembly of claim 5 wherein said body member has an upwardly presented slot formed therein for receiving the handle of a drink container.

8. In combination with a supporting member, a utensil holder assembly for disabled persons, comprising:
a receiver support removably secured to the supporting member;
a first elongated support arm having first and second ends;
a mount selectively connected to said receiver support;
said first end of said first elongated support arm being selectively pivotally secured to said mount;
an articulated arm assembly having first and second ends;
said articulated arm assembly including at least first and second articular arms;
said first and second articular arms each having first and second ends;
said first end of said first articular arm being selectively movably connected to said second end of said support arm by a first selectively articulable joint;
said first selectively articulable joint allowing said first articular arm to move about a plurality of axes with respect to said support arm;
said second end of said first articular arm being selectively movably connected to said first end of said second articular arm by a second selectively articulable joint;
said second selectively articulable joint allowing said second articular arm to move about a single axis with respect to said first articular arm;
a connector element selectively movably connected to said second end of said second articular arm by a third selectively articulable joint;
said third selectively articulable joint allowing said connector element to move about a plurality of axes with respect to said second selectively articulable joint;
and a utensil holder selectively removably secured to said connector element;
said utensil holder comprising a hollow cylindrical body member having upper and lower ends and a downwardly extending mounting pin positioned at one side thereof which is selectively receivable by said connector element.

9. The utensil holder assembly of claim 8 wherein said mounting pin is rotatably received by said connector element.

* * * * *